United States Patent

[11] 3,556,173

[72] Inventor  Hans Grothoff
              Valbert/Westphalia, Germany
[21] Appl. No. 743,270
[22] Filed     July 3, 1968
[45] Patented  Jan. 19, 1971
[73] Assignee  Carl Gisbert Siebel
              Duesseldorf, Germany.
              by mesne assignments
[32] Priority  July 5, 1967
[33]           Germany
[31]           1,551,620

[54] FILLING HEAD FOR PRESSURIZED FLUID
     11 Claims, 5 Drawing Figs.
[52] U.S. Cl. .................................. 141/20,
                                                141/391
[51] Int. Cl. ............................................ B65b 31/00
[50] Field of Search ........................................... 141/3, 20,
              46, 287, 312, 383; 277/72, 214, 215, (Inquired);
                                    53/(Inquired); 141/392

[56]             References Cited
              UNITED STATES PATENTS
1,188,044   6/1916   Clay ..................... 141/383X
1,742,288   1/1930   Shields .................. 141/287X
2,614,793   10/1952  Storm ..................... 277/177X
2,684,805   7/1954   McBean ................... 141/20X
3,103,956   9/1963   Focht ..................... 141/3
3,179,132   4/1965   Focht ..................... 141/20
3,201,136   8/1965   Harrison et al. .......... 277/207(B)X
3,214,182   10/1965  Herbruggen ............... 277/215X Primary Examiner—Laverne D. Geiger
Assistant Examiner—Edward J. Earls
Attorney—Michael S. Striker ABSTRACT: A filling head for admitting a pressurized fluid into a container having a projecting inlet portion. A sleeve member communicates at its rear end with a source of pressurized fluid and at its front end is provided with a radially inwardly extending annular flange. An insert is fluid-tightly received in the front end portion and has a recess facing the opening of the flange. The recess may be placed into communication with the source of pressurized fluid. The insert has an annular front face abutting against the flange and the recess includes a wider forward portion adjacent the front face and a narrower rearward portion dimensioned to accommodate the inlet portion. The forward portion is bounded by an inner annular surface and a circumferential surface extending therefrom to the front face and the surfaces define with the flange a radially inwardly open groove. An annular sealing member of elastically deformable material is received in the groove and the inlet portion of the container to be filled will extend through the annular sealing member into the recess. A plurality of kerfs are provided at least in the annular surface and communicating with the recess so that, when pressurized fluid is admitted into the latter, some of this pressurized fluid will enter into the kerfs and elastically compress the sealing member into sealing engagement with the inlet portion of the container to be filled.

PATENTED JAN 19 1971

3,556,173

INVENTOR:
HANS GROTHOFF

By: Michael S. Striker,
Attorney

«3,556,173»

FILLING HEAD FOR PRESSURIZED FLUID

BACKGROUND OF THE INVENTION

The present invention relates to a filling head, and more particularly to a filling head for admitting a pressurized fluid into a container having a projecting inlet portion. Still more specifically the present invention relates to a filling head for admitting a compressed or pellant gas into a pressurized discharge container, such as an aerosol container.

Pressurized discharge containers, generally known as aerosol containers, contain a product to be dispensed and a compressed, particularly liquefied propellent gas. They are provided with a valve, a spray nozzle communicating with the valve and suitable actuating means for opening the valve so that the propellent gas, acting as a carrier, will escape from the spray nozzle and take with it the contents to be dispensed. Of course, the propellent gas must be introduced into the container or dispenser and for this purpose it is known to provide filling heads having a recess so that they can be placed over the valve and spray nozzle of the container to be filled with the valve and spray nozzle being at least partially accommodated in this recess. The front end of such filling heads is provided with an annular groove in which is disposed an annular sealing gasket which engages the housing of the container or dispenser valve at the exterior of this housing so as to provide a seal against the escape of compressed gas from the recess as such gas is admitted into the recess for the purpose of entering from there through the valve into the container to be filled.

In known constructions of this type the inner diameter of the annular sealing gasket is provided somewhat smaller than the valve housing which the sealing gasket is to contact in sealing relationship. However, it has been found that the high mechanical stress which develops in the sealing gasket as the same is forced over the valve housing when the filling head is moved into filling position, and particularly the friction which occurs between the sealing gasket and the valve housing, result in rapid deterioration of such gaskets. Thus, the abrasion resulting from the friction between the gasket and the valve housing, taken in conjunction with the deleterious influence of the intensely cold propellent gas upon the material of the gasket, leads to rapid deterioration of the gasket material. The internal diameter of the gasket quickly increases to the outer diameter of the valve housing with which the gasket is to constitute a seal. When this takes place, the sealing action which must necessarily be very efficient at the filling pressures of substantially 50—80 atmospheres at which the propellent gas is admitted through the filling head into the container, is no longer sufficient. This problem is aggravated by the fact that the valve housing itself, which is usually secured to the container by a crimping process, is frequently out-of-round as a result of such crimping.

Under these circumstances the life of these annular gaskets utilized in such filling heads is considerably less than one working day, a disadvantage which has seriously hampered the introduction of such filling heads for the purposes at hand. Attempts to overcome the problem by having the inner diameter of the annular gasket be larger than the outer diameter of the valve housing with which they are to constitute a seal, and mechanically compressing the sealing gasket into sealing engagement with the valve housing prior to admission of the compressed gas through the filling head, have not been found satisfactory because the mechanism necessary for effecting such compression, and for coordinating the compression with the gas admission, is very complicated and expensive as well as being subject to breakdowns due to its complexity.

It is thus a general object of the present invention to overcome the aforementioned disadvantages.

A more particular object of the present invention is to provide a filling head of the type in question wherein an annular sealing gasket will provide a reliable seal against the inlet portion of a container to be filled, usually the housing of an inlet-and-outlet valve of such a container, but without the extremely short lifespan known for such gaskets from the prior art.

SUMMARY OF THE INVENTION

In pursuance of these objects, and others which will become apparent hereafter, one feature of my invention resides in the provision of a filling head for admitting a pressurized fluid into a container having a projecting inlet portion. This filling head comprises a sleeve member having a rear end portion communicating with a source of pressurized fluid, and a front end portion including a radially inwardly extending flange which is adapted to abut against the container to be filled and which has an opening through which the inlet portion of the container can extend. An insert is fluid-tightly received in the front end portion of the sleeve member and has a recess which faces the opening of the flange and which is arranged to be placed in communication with the source of pressurized fluid. The insert has an annular front face abutting against the inner side of the flange and the recess extends rearwardly from the front face and includes a wider forward portion and a narrower rearward portion dimensioned to accommodate the inlet portion. The forward portion of the recess is bounded by a transversely extending inner annular surface and a circumferential surface which extends from this annular surface to the front face. The surfaces define with the flange a groove having a radially inwardly facing open side. An annular sealing member of elastically deformable material is received in this groove confined between the surfaces and the flange and has a central aperture registering with the opening of the flange and being dimensioned to accommodate the inlet portion of the container to be filled. A plurality of kerfs are provided at least in the inner annular surface and communicate with the recess so that, when the inlet portion of the container to be filled is received in this recess through the opening of the flange and the aperture of the sealing member, and when thereupon pressurized fluid is admitted into the recess from the source, some of this fluid will enter into these kerfs and will effect elastic compression of the sealing member into sealing engagement with the inlet portion of the container to thereby prevent escape of fluid from the recess.

With the construction according to my present invention the wear of the annular sealing member due to abrasion is reduced to an absolute minimum because there is either no relative motion between the filling head and the valve housing during admission of the pressurized fluid, or at most only a very insignificant relative motion which might occur at very high filling pressures. Furthermore, the fact that no mechanisms are provided which effect mechanical compression of the sealing gasket into sealing engagement with the valve housing, results in a considerable reduction in the filling time per container because admission of pressurized fluid can begin as soon as the filling head is in place. The construction according to the present invention guarantees a perfect seal at all times even if the housing of the valve is out-of-round to a significant extent so that there is a locally substantial clearance between portions of this housing and the annular gasket.

As a result of all of this, the lifetime of such an annular sealing gasket employed in the construction according to my present invention is increased significantly to a minimum of one week, as compared to the previous maximum of less than one day.

Advantageously, the aforementioned kerfs will extend radially of the recess, and the efficiency of operation of my device may be further improved by having the kerfs extend from the transversely extending inner annular surface into the circumferential surface which extends from this annular surface to the front face of the insert. The particular cross section of the kerfs may be of various different configurations, but in accordance with the invention it is advantageous if this cross section is semicircular.

The cross section of the groove in which the gasket is received may advantageously be polygonal, specifically either square or rectangular, because this provides for a proper seating of the sealing gasket. Furthermore, a groove of such cross section can be most easily manufactured.

The sealing gasket itself is advantageously of circular cross section and in uncompressed condition has an inner diameter which is larger than the outer diameter of the valve housing with which it is to provide a seal. I have obtained exceptionally good results by using cross-linked polyurethane as the material from which the annular sealing gasket is made because this material is largely resistant to the effects of low temperature and to contacts with media which cause other materials to swell or shrink.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
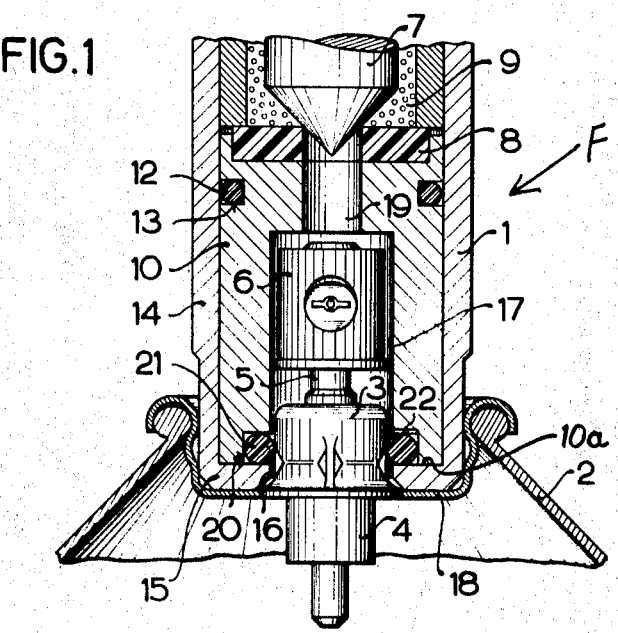
FIG. 1 is a fragmentary longitudinal section of a filling head embodying my invention, shown here in filling position on the inlet end of a container.

Discussing now the drawing in detail, and firstly FIG. 1 thereof, it will be seen that the illustrated filling head is generally identified with reference numeral F. It is shown in position on a container 2 provided with a discharge and filling valve 4 which is located in a valve housing 3 secured to the upper end wall 18 of the container 2. A stem 5 which is connected with the valve 4 in known manner projects upwardly from the valve housing 3 and carries the actuating member 6 which is also provided with a spray discharge nozzle in known manner.

The filling head F comprises a sleeve member 1 which at its forward end is provided with a radially inwardly extending annular flange 15 defining an opening 16. The rearward end of the sleeve member 1 communicates with a source of pressure pressurized fluid, for example compressed liquefied propellent gas such as illustrated at 9, and is provided with a valve member 7, which, together with an elastic seal 8, normally prevents passage of the propellent gas 9 into the front portion of the filling head. Evidently, to permit such passage in order to effect filling of the container 2, it will be necessary to move the valve member 7 from its position illustrated in FIG. 1. This is accomplished in well-known manner, as is the control of the quantity of gas to be admitted.

An annular gasket 12 is received in a circumferential external groove 13 provided in an insert 10 and provides a seal between the insert 10 and the wall portion 14 of the sleeve 1.

The insert 10 has an annular front face 10a abutting the inner side of the flange 15 of the sleeve 1, and a recess or passage 17 extending rearwardly of this annular front face 10a. As the drawings show, particularly FIG. 1, the recess consists of two sections, namely a front section closer to the front face 10a and a rear section rearwardly spaced from the front section. The rear section is dimensioned so as to accommodate the valve housing 3 and the actuating portion 6, and the front section of the recess 17 is wider than the rear section and bounded by a transversely extending inner annular surface 10b and a circumferential surface 10c extending from the inner annular surface 10b into the front face 10a. This is clearly shown in the drawing, particularly in FIG. 2. The opening 16 of the flange 15 is so dimensioned as to accommodate the valve housing 3 with slight clearance, and the recess 17 registers with the opening 16. The surfaces 10b and 10c constitute, together with the inner side of the flange 15, a groove 20 having a radially inward open side and accommodating an annular sealing member 21, for example an O-ring, consisting of elastically deformable material for which I have found cross-linked polyurethane to be particularly advantageous as outlined above. The inner diameter of the member 21 is at least equal to the outer diameter of the valve housing 3, but may be somewhat larger to accommodate the valve housing 3 with clearance, if desired. The groove 20 is advantageously of polygonal cross-sectional configuration, and more specifically of rectangular or quadratic cross section as illustrated. It will be noted from FIG. 1 that the axial length of the recess 17 intermediate the front face 10a of the member 10 and the end wall of the recess, from which a bore 19 extends inwardly into communication with the valve member 7, is slightly longer —when taken in conjunction with the thickness of the annular flange 15—than the distance between the forward front face of the actuating member 6 and the end wall 18 of the container 2.

Figure 2:
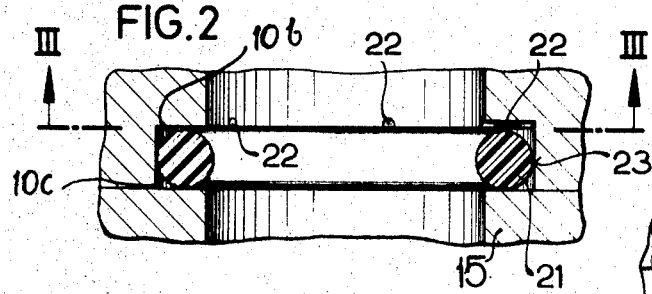
FIG. 2 is a fragmentary section on an enlarged scale of the gasket utilized in the embodiment of FIG. 1, and of the groove in which this gasket is received.

In accordance with my invention, at least the annular surface 10b is provided with a plurality of kerfs 22 extending outwardly from the inner circumferential face bounding the recess 17 and communicating with the latter. These kerfs 22 are angularly distributed about the recess 17 and, in the illustrated embodiment, extend substantially radially thereof. They are in the illustrated embodiment of semicircular cross-sectional configuration, but may be of other cross-sectional configuration if desired or found necessary for manufacturing reasons or because of fluid-flow considerations. In FIG. 2, I have shown that the kerfs 22 may comprise portions 23 provided provided in the circumferential surface 10c, but while this may be advantageous for obtaining even better compression of the member 21, it is not absolutely necessary because the invention is operative if the kerfs 22 are provided only in the surface 10b. The member 21 is in the illustrated embodiment of round cross-sectional configuration and fills the interior of the groove 20 to a major extent.

Figure 3:
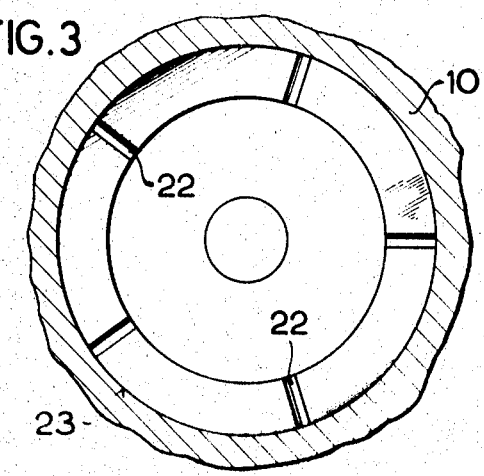
FIG. 3 is a section taken on the line III–III of FIG. 2.

The distribution of the kerfs 22 is shown in FIG. 3 for the exemplary illustrated embodiment.

Figure 4:
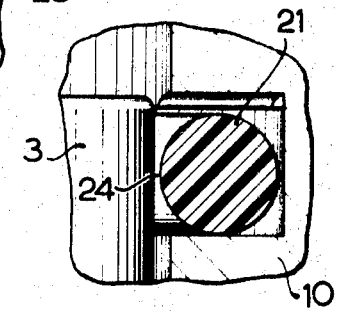
FIG. 4 is a fragmentary partly sectioned detail view, on a considerably enlarged scale, illustrating the cross-sectional configuration and position of the gasket in its groove prior to initiation of the filling procedure.
Figure 5:
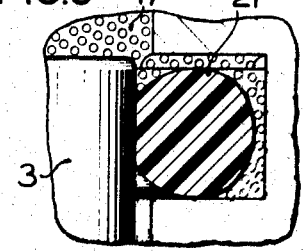
FIG. 5 is a view similar to FIG. 4 but illustrating the gasket upon initiation of the filling procedure.

In the unoperated condition of the filling head F, that is while no fluid is being admitted into the recess 17, the inner diameter of the member 21, is at most equal to the outer diameter of the valve housing 3, as pointed out before, or it may be somewhat larger. In the present embodiment I have illustrated it as being somewhat larger so that, as shown in FIG. 4, there exists a slight clearance 24 between the valve housing 3 and the member 21. If, now, the filling head is operated, that is if the valve member 7 is operated so as to permit entry of compressed fluid into the recess 7, some of this fluid will flow into the kerfs 22 and from there into the curved portions 23, if such are provided. In any case, however, the fluid in these kerfs will pass from them into those portions of the groove 20 which are not filled by the presence of the member 21. This is illustrated in FIG. 5 where it will be seen that under the pressure of the thus-introduced compressed fluid the member 21 will be resiliently compressed into engagement with the outer surface of the valve housing 3 providing a hermetic seal between the valve housing 3 and the filling head F. It will also be clear that, as soon as the pressure of fluid ceases, that is when the valve member 7 is restored to its closure position illustrated in FIG. 1, the member 21 will return to its unoperated position as shown in FIG. 1, owing to its resiliency.

It will be appreciated that a variety of modifications is possible in the embodiment which has been shown in the drawing by way of example only, and that all of such modifications can be accomplished without departing from the spirit and scope of the present invention so that they are intended to be encompassed.

It will be understood that each of the elements described above, or two or more together, may also find a useful application in other types of constructions differing from the types described above.

While the invention has been illustrated and described as embodied in a filling head for admitting pressurized fluid into a container, it is not intended be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

What is claimed as new and desired to be protected by Letters Patent is set forth in the appended claims.

I claim:

1. A filling head for admitting a pressurized fluid into a container having a projecting inlet portion, said filling head having an end face adapted to abut against a face of the container about said projecting inlet portion and a passage extending from said end face through said head for feeding of pressurized fluid into said inlet portion of said container, said passage having a portion with an inner surface of a diameter slightly greater than the maximum diameter of said inlet portion so that the latter may be received with clearance in said passage portion, and an annular grove extending from said inner surface of said passage portion into said head and being bounded by a pair of annular surfaces extending outwardly from said inner surface, one of which is further spaced from said end face than the other, and an outer circumferential surface extending between said pair of annular surfaces; an annular sealing member of elastically deformable material loosely received in said groove confined between said annular surfaces and said circumferential surface and having a central aperture substantially coaxial with said passage and dimensioned to accommodate said inlet portion without being compressed by the latter; a plurality of kerfs provided in at least said one annular surface and communicating with said passage; and a single valve in said passage upstream of said portion for opening and closing said passage so that, when said inlet portion is received in said passage portion and when pressurized fluid is admitted through said valve into the latter, the pressurized fluid will not only flow through said inlet portion into said container but also through said clearance between said inner surface and said inlet portion into said kerfs and effect elastic compression of said sealing member into sealing engagement with said inlet portion to thereby prevent escape of fluid during the filling of said container.

2. A filling head as defined in claim 1, wherein said kerfs are angularly spaced with reference to one another.

3. A filling head as defined in claim 2, wherein said kerfs extend radially of said recess.

4. A filling head as defined in claim 1, wherein said kerfs are of semicircular cross section.

5. A filling head as defined in claim 1, wherein said kerfs comprise first portions provided in said one annular surface and second portions respectively communicating with said first portions and provided in said circumferential surface.

6. A filling head as defined in claim 1, wherein said sealing member is an O-ring.

7. A filing head a as defined in claim 1, wherein said groove is of polygonal cross-sectional configuration.

8. A filling head as defined in claim 7, wherein said groove is of rectangular cross-sectional configuration.

9. A filling head as defined in claim 7, wherein said groove is of square cross-sectional configuration.

10. A filling head as defined in claim 1, wherein said sealing member is an annulus of circular cross section, and wherein said aperture in the uncompressed condition of said sealing member accommodates said inlet portion with some clearance.

11. A filling head as defined in claim 1, wherein said sealing member consists of cross-linked polyurethane.